May 30, 1961  M. H. TUFT  2,985,993
SIDE DELIVERY RAKE
Filed June 20, 1958  2 Sheets-Sheet 1
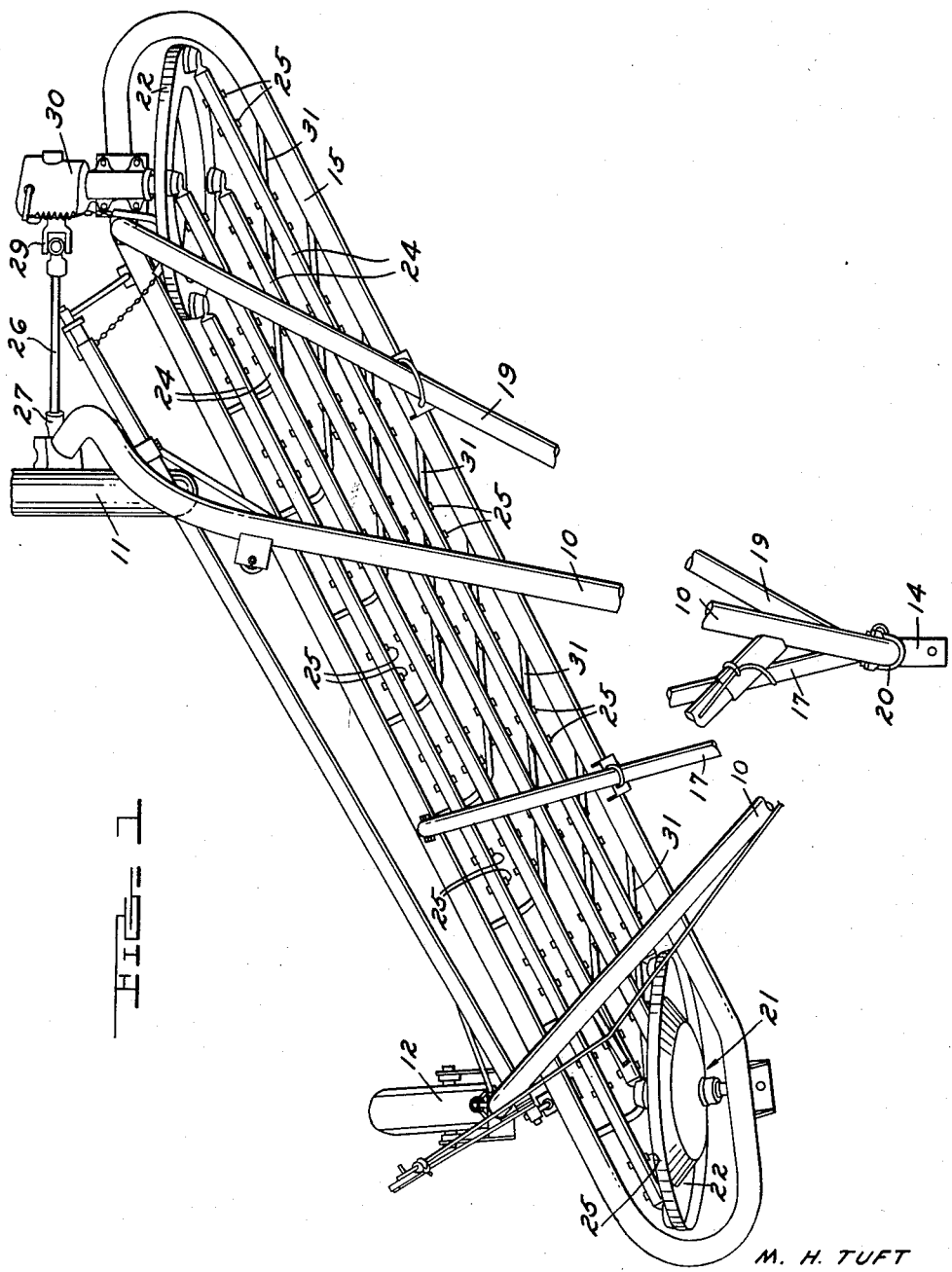
M. H. TUFT
INVENTOR.
E. C. McRAE
BY  J. R. FAULKNER
P. F. HILDER
ATTORNEYS

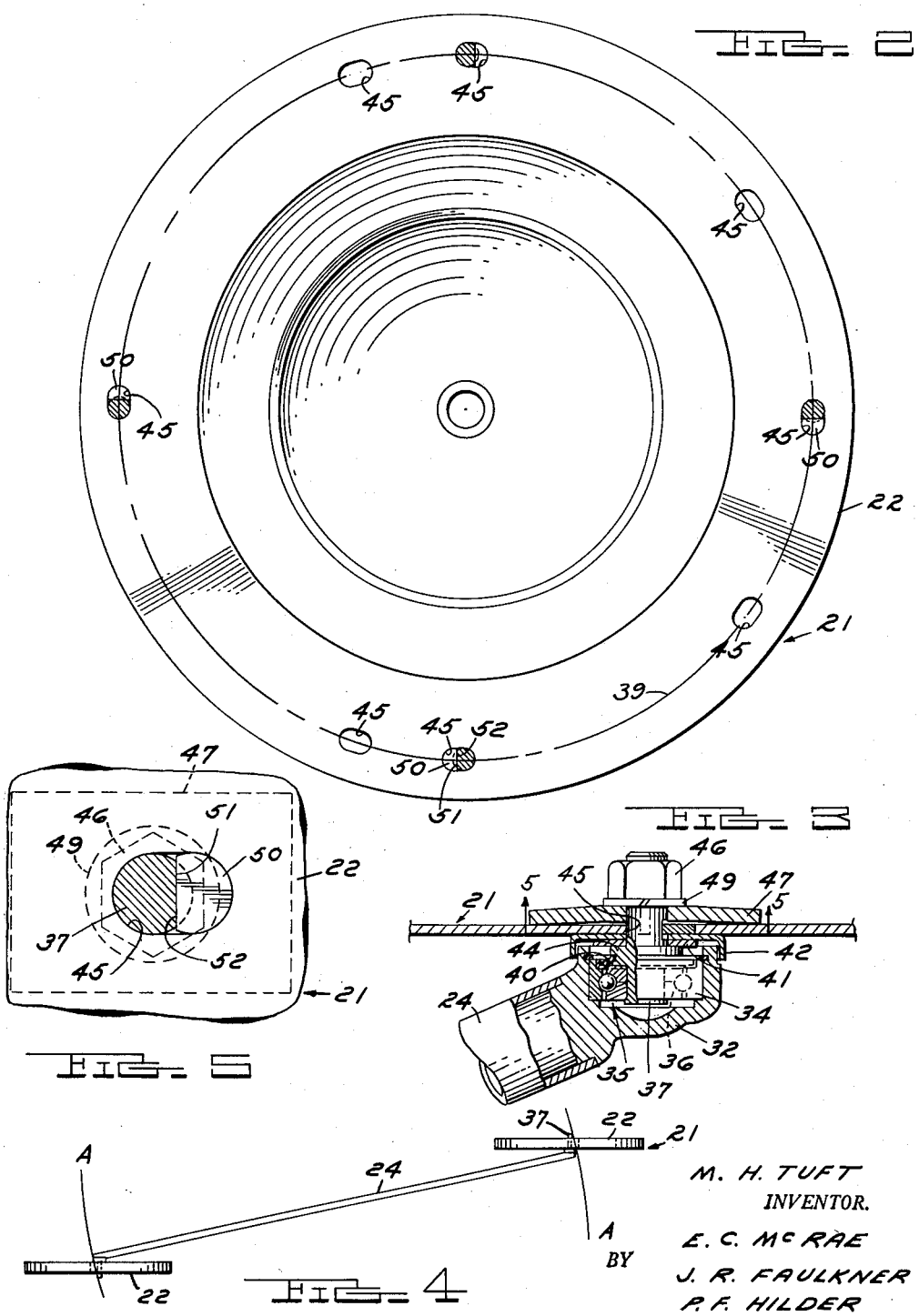

United States Patent Office

2,985,993
Patented May 30, 1961

2,985,993
SIDE DELIVERY RAKE

Miles H. Tuft, Birmingham, Mich., assignor to Ford Motor Company, Dearborn, Mich., a corporation of Delaware Filed June 20, 1958, Ser. No. 743,279

7 Claims. (Cl. 56—377)

This invention relates to side delivery rakes, and more particularly to a tooth bar mounting for such rakes.

Side delivery rakes frequently are formed of a raking reel which is oblique to the line of travel of the rake and comprises several horizontally extending tooth bars supported by rotary reel plates or discs at the ends of the reel. Spring teeth or tines secured at intervals to the tooth bars engage the hay or other crop and sweep it to one side as the rake progresses across the field. A rake of this general type is shown in Erickson et al. U.S. Patent 2,719,401.

The ends of the tooth bars are rotatably supported on the reel plates by bearings having their axes parallel to the axes of the reel plates. One type of bearing commonly used, and disclosed in Spicacci U.S. Patent 2,761,271, comprises a bearing stud bolted through the reel plate and supporting an anti-friction bearing on the end of the stud, from which the end of the rake bar is supported.

Removal of a rake bar from the reel plates of a rake as shown in the Spicacci patent is difficult because the stud must be held against rotation while the retaining nut is being removed. In addition, the reel plates of the rake, although offset, face towards each other and, in removing the bearing stud from the reel plate, the stud cannot be withdrawn axially. In most rake constructions of this type, it is necessary to loosen both ends of all of the rake bars and to loosen the mounting for one of the reel plate bearings and move the reel plate axially away from the other reel plate, and even then it is difficult due to the necessity of supporting all of the rake bars. Assembly is even more difficult, inasmuch as all the rake bars must be supported and their studs entered generally simultaneously into one of the reel plates.

The present invention comprises an improved mounting of the bearing studs in the reel plates whereby the bearing studs are received within elongated slots extending outwardly away from the rake bar at one position of rotation of the reel plates to provide the necessary clearance for removal of the studs. The extra clearance for the stud provided by the elongated slot is filled by a key which fits beside the bearing stud. Preferably, the bearing stud has a flat which is engaged by the key to wedge the bearing stud against rotation, both during use of the rake and when removing the stud retaining nut.

Among the objects of the present invention are to provide an improved side delivery rake bar and reel plate assembly in which the rake bars are more easily removed; to provide such a construction which is durable and dependable in operation, and which is economical to manufacture; and to generally improve assemblies of the type described.

Other objects, and objects relating to details and economies of manufacture and use will be more apparent from the detailed description to follow:

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

Figure 1 is a top plan view of a side delivery rake according to the present invention, the intermediate portion of the rake being broken away for convenience of illustration.

Figure 2 is an enlarged elevation of one of the reel plates, the bearing studs being shown in cross section.

Figure 3 is an enlarged plan view of one end of the rake bar mounted upon the reel plate with parts broken away or shown in section.

Figure 4 is a diagrammatic view indicating the movement of one end of a rake bar in disassembling it from the reel plates.

Figure 5 is an enlarged view of a portion of the reel plate, taken on the line 5—5 of Figure 3 and showing the bearing stud and key assembly.

Referring to Figure 1, the side delivery rake in which the present invention is embodied has a main frame 10 which is supported by ground wheels 11 and 12, the ground wheel 11 driving the rake, as will be explained, by contact with the ground, and the ground wheel 12 being a castering wheel forming a second support for the rake. The forward end 14 of the main frame is adapted for connection with a tractor, the connection forming the third point of support of the rake.

A reel frame 15 is supported from the main frame 10 and comprises an endless pipe frame which is spring-supported from the main frame 10 and has a pair of forwardly converging arms 17 and 19 clamped to the forward end portion of the main frame by a U bolt 20.

The raking reel 21 comprises a pair of reel plates 22, 22 rotatably mounted on the ends of the reel frame 15, the reel plates facing each other and rotating on parallel but offset axes which extend generally in the direction of the line of draft of the rake. The reel plates 22, 22 are connected by a series of rake bars 24 which preferably are formed of lengths of pipe, the rake bars having downwardly projecting teeth 25 secured to the bars at intervals along their length.

The rake bars 24 are equal in length and equally spaced about the periphery of the reel plates 22, 22, being mounted for rotation on the reel plates on axes parallel to the reel plate axes. Thus, as the rake is drawn across the field, the driving wheel 11, operating through a drive shaft 26 and universal joints 27 and 29, drives a right angle gear box 30, driving the adjacent reel plate 22. As the driving reel plate 22 rotates, it carries the rake bars 24, in turn rotating the driven reel plate 22. The movement is such that each tooth 25 along the length of each rake bar moves in a circular path relative to the frame 15 and parallel to the plane of rotation of the reel plates 22, 22. Along the lower portion of the arc of rotation, teeth 25 principally are moving laterally to the right as viewed in Figure 1, and this movement of the teeth is relied on for the side delivery action of the rake. A series of generally parallel stripper bars 31 extend between the opposite sides of the reel frame 15, the teeth moving between the stripper bars 31 and the stripper bars serving to remove any crop adhering to the teeth.

Referring to Figure 3, each end of each rake bar 24 is provided with a bearing housing 32 which receives the outer race 34 of an anti-friction bearing 35 which is preferably of the ball bearing type. The inner race 36 of the bearing is fixed to a bearing stud 37 extending axially of the bearing, which extends through a hole 45 in the reel plate 22. A seal 40 protects the exposed end of the bearing 35. The studs 37 extend at an obtuse angle from the ends of the rake bars 24, being parallel and extending in opposite directions from the rake bars.

A washer 41 and dust cover 42 are clamped against the face of the reel plate 22 by a shoulder 44 on the stud 37, which extends through the hole 45 in the reel plate. The stud 37 is held in assembled relation with the reel plate 22 by a nut 46 threadedly engaged with the stud and a backing plate 47 for reinforcing the reel plate 22. Preferably, the backing plate 47 is rectangular in outline, the stud-receiving portion of the plate being biased away from the surface of the reel plate 22, whereby, upon tightening the nut 46, the backing plate is more or less flattened against the reel plate to distribute the loading on the reel plates 22. If desired a lock washer 49 may be placed under the nut 46 to aid in preventing loosening of the nut.

The holes 45 in each reel plate 22 are oval, being formed in the shape of two semi-circular arcs connected by parallel tangents, and the width of the hole being such as to receive the bearing stud 37 with ordinary clearance. Preferably, the length or major axis of the holes 45 extend perpendicular to the radius of the reel plates extending through the hole, the hole being extended in a direction away from the rake bar when the rake bar is at the top of its orbit. Preferably, the reel plates 22, 22 are similar and are provided with similarly shaped holes 45, the bearing studs 37 of the rake bar being received within the ends of the holes towards each other and towards the rake bar. The holes 45 lie along the circumference of a circle 39 concentric to the central bearing member and are of sufficient extent to provide clearance for the end of the stud 37 when the rake bar is disassembled from the reel plates 22, 22, the end of the bearing studs moving along the arcs "A" indicated in Figure 4.

If desired, round holes (not shown) can be used in one of the reel plates 22 for receiving the bearing studs 37 at one end of the rake bars 24, in which case the oval holes 45 in the other reel plate 22 would have to be longer in order to provide the necessary clearance for the end of the stud in removing the rake bar. While positioning of a rake bar at the top of the raking reel for removal of the rake bar is preferred due to less interference with the stripper bars 31 and other portions of the rake, it is possible to orient the oval holes 45 in the reel plates for removal of a rake bar at any other position of its orbit, the excess clearance of the holes 45 extending away from the rake bar when the bar is positioned for removal. However, unless the rake bar is positioned for removal at either the top or bottom of its orbit, the holes 45 will extend more or less radially rather than tangentially of the reel plates, and the raking reel would be thrown out of balance to a greater extent if, through inadvertence, the key 50 were assembled on the wrong side of a stud 37.

A key 50 is provided to fill the excess clearance between the margin of the hole 45 and the bearing stud 37, the key being formed of flat sheet metal of about the same thickness as the reel plates 22. The key 50 is retained within the hole 45 by the dust cover 42 on one side of the reel plate 22 and by the backing plate 47 on the other side of the reel plate. The arrangement is such that the key 50 may be inserted within the hole 45 after the bearing stud 37 has been entered therein and before the backing plate 47 has been placed over the stud.

Preferably, a flat 51 extending chordally of the bearing stud 37 within the hole 45 is provided, and the interfitting portion of the key 50 is provided with a straight side 52 as indicated in Figure 5. The remainder of the margin of the key 50 has a circular form to fit within the semi-circular end of the hole 45, the circular portion of the margin of the key 50 preferably extending for a little over 180°. Upon rotation of the bearing stud 37, the flat 51 of the stud engages the straight side 52 of the key 50, preventing further rotation of the stud. As the flat 51 of the bearing stud engages the key 50, it tends to rotate the key within the slot so as to wedge both parts against any further movement. This construction positively retains the bearing stud 37 against rotation while applying or removing the nut 46, and, in addition, helps to prevent rotation or other movement of the bearing stud during operation of the rake.

Each rake bar 24 is separately removable from reel plates 22, 22 without loosening or changing the mounting of the reel plates. In order to remove any rake bar 24, the raking reel 21 is rotated until the bar to be removed is at the top. Then the nut 46, lock washer 49, backing plate 47, and key 50 are removed from the bearing studs 37 at the ends of the rake bar. During loosening of the nut 46, the key 50 holds the bearing stud 37 against rotation within the hole 45 in the reel plate, making it unnecessary to hold the stud against rotation.

The bearing studs 37 will be within the confronting portions of the oval holes 45 in the reel plates, the clearance for removal of the studs being at the ends of the holes away from the rake bar. Either end of the rake bar can be removed by pulling the stud 37 out of the hole 45, the stud at the opposite end of the rake bar moving within the hole 45 as the first stud is removed. After removal of the stud at one end of the rake bar, the stud at the opposite end may be withdrawn from the reel plate. It is unnecessary to move either of the reel plates 22 axially or disturb their bearing mounting in any way.

The remainder of the rake bars may be removed in a similar manner after rotating the raking reel 21 so as to bring each bar to be removed to the top of the reel. Preferably, each reel plate 22 is provided with two sets of holes 45 equally spaced along the periphery of the reel. One set may consist of four holes for use when four rake bars are desired, and the other set of five holes being used when five rake bars are desired. One hole 45 may be common to both sets, as indicated in the drawings.

The remainder of the rake, including the mechanism for raising the raking reel 21 and for controlling the drive to the raking reel, do not form a part of the present invention and need not be described in detail for an understanding of the present invention.

I claim:

1. In a rotary side delivery rake of the type having a pair of opposed, offset, parallel reel plates each having a central bearing member, and a plurality of rake bars having oppositely extending bearing studs at the ends thereof, the studs of each rake bar being parallel and extending at an obtuse angle from the rake bar and the plates each having a plurality of openings spaced along the circumference of a circle concentric to said bearing member, said openings having the bearing studs received therein and said openings in at least one reel plate being elongated to permit lateral movement of the stud received therein during assembly or removal of the rake bars from the plates, and a key in each of said elongated openings and substantially filling that portion of the opening not occupied by the stud.

2. In a rotary side delivery rake as claimed in claim 1, the key wholly within the elongated opening.

3. In a rotary side delivery rake as claimed in claim 2, both of the reel plates being provided with elongated stud-receiving openings.

4. In a rotary side delivery rake as claimed in claim 3, the studs received within the elongated openings having a non-circular cross-section, and the keys interfitting with said cross-section to prevent rotation of the studs within the openings.

5. In a rotary side delivery rake as claimed in claim 4, the studs having a flat, chordally extending portion within the openings and the keys having a straight edge fitting against said flat portion of the studs.

6. In a rotary side delivery rake as claimed in claim 3, the stud-receiving openings for each rake bar being elongated in a direction in prolongation of the rake bar when the rake bar and reel plates are at a specific point of their orbit of rotation.

7. In a rotary side delivery rake as claimed in claim 6, the openings for receiving the studs of each rake bar extending in prolongation of the rake bar when each rake bar is at the top of its path of rotation.

References Cited in the file of this patent
UNITED STATES PATENTS

| | | |
|---|---|---|
| 2,761,271 | Spicacci | Sept. 4, 1956 |
| 2,795,101 | Arend | June 11, 1957 |
| 2,815,636 | Reilly | Dec. 10, 1957 |